(12) United States Patent
Higuchi (10) Patent No.: US 8,195,180 B2
(45) Date of Patent: Jun. 5, 2012

(54) BASE STATION APPARATUS AND METHOD USED IN MOBILE COMMUNICATIONS SYSTEM

(75) Inventor: Kenichi Higuchi, Saitama (JP)

(73) Assignee: NTT Docomo, Inc., Tokyo (JP)

( * ) Notice: Subject to any disclaimer, the term of this patent is extended or adjusted under 35 U.S.C. 154(b) by 126 days.

(21) Appl. No.: 12/863,752

(22) PCT Filed: Jan. 9, 2009

(86) PCT No.: PCT/JP2009/050218
§ 371 (c)(1),
(2), (4) Date: Sep. 16, 2010

(87) PCT Pub. No.: WO2009/093489
PCT Pub. Date: Jul. 30, 2009

(65) Prior Publication Data
US 2011/0009142 A1    Jan. 13, 2011

(30) Foreign Application Priority Data
Jan. 25, 2008 (JP) ................................. 2008-015493

(51) Int. Cl.
*H04W 72/00* (2009.01)
(52) U.S. Cl. ..................... 455/450; 455/452.2; 455/464; 455/561; 375/E7.141
(58) Field of Classification Search ............... 455/422.1, 455/450–453, 464, 509, 561; 370/329, 330, 370/395.41; 375/E7.141
See application file for complete search history.

(56) References Cited

U.S. PATENT DOCUMENTS

| | | | | |
|---|---|---|---|---|
| 6,421,370 | B1 * | 7/2002 | Yasaki | 375/141 |
| 6,650,906 | B1 * | 11/2003 | Bousquet et al. | 455/522 |
| 6,690,915 | B1 * | 2/2004 | Ito et al. | 455/7 |
| 7,120,189 | B2 * | 10/2006 | Zeira et al. | 375/130 |
| 7,184,769 | B2 * | 2/2007 | Tsutsumi et al. | 455/442 |
| 7,953,374 | B2 * | 5/2011 | Lin et al. | 455/67.13 |
| 7,970,429 | B2 * | 6/2011 | Islam et al. | 455/525 |
| 8,041,308 | B2 * | 10/2011 | Yun et al. | 455/69 |
| 8,111,681 | B2 * | 2/2012 | Taira et al. | 370/345 |

(Continued)

FOREIGN PATENT DOCUMENTS

WO    2005/125263 A1    12/2005

(Continued)

OTHER PUBLICATIONS

NTT DoCoMo, "Frequency Domain Channel-Dependent Scheduling Considering Interference to Neighbouring Cell for E-UTRA Uplink," 3GPP TSG RAN WG1 Meeting #47bis, R1-070099, Jan. 15-19, 2007, 6 pages.

(Continued)

*Primary Examiner* — Dominic E Rego
(74) *Attorney, Agent, or Firm* — Osha • Liang LLP (57) ABSTRACT

A base station apparatus in a mobile communications system is provided. The base station apparatus includes a measuring unit which receives a reference signal from a user apparatus and measures received quality for each frequency resource block; a unit which provides a reference metric from the received quality; a modifying unit which modifies the reference metric with at least first and second parameters, and provide the modified metric; a scheduler which compares modified metrics of respective frequency resource blocks and provides a radio resource allocation plan; and a unit which reports, to the user apparatus, control information which indicates the allocation plan.

13 Claims, 7 Drawing Sheets

U.S. PATENT DOCUMENTS

| | | | |
|---|---|---|---|
| 2002/0089451 A1* | 7/2002 | Wang et al. | 342/458 |
| 2005/0021586 A1* | 1/2005 | Bichot et al. | 709/200 |
| 2005/0124352 A1* | 6/2005 | Fernandez-Corbaton et al. | 455/452.2 |
| 2007/0064640 A1* | 3/2007 | Grilli et al. | 370/320 |
| 2008/0285477 A1 | 11/2008 | Kuroda et al. | |
| 2011/0007653 A1* | 1/2011 | Casaccia et al. | 370/252 |
| 2011/0085466 A1* | 4/2011 | Shim | 370/253 |

FOREIGN PATENT DOCUMENTS

| | | |
|---|---|---|
| WO | 2007/023787 A1 | 3/2007 |

OTHER PUBLICATIONS

Siemens, "Evolved UTRA uplink scheduling and frequency reuse," 3GPP TSG RAN WG1 Meeting #41, R1-050476, 8 pages.

NTT DoCoMo et al., "Channel-Dependent Scheduling Method for Single-Carrier FDMA Radio Access in Evolved UTRA Uplink," 3GPP TSG RAN WG1 #42 on LTE, R1-050701, Aug. 29-Sep. 2, 2005, 10 pages.

Samsung, "Uplink Scheduling," 3GPP RAN WG1 Meeting #44, R1-060353, Feb. 13-17, 2006, 6 pages.

Huawei, "Soft Frequency Reuse Scheme for UTRAN LTE," 3GPP TSG RAN WG1 Meeting #41, R1-050507, May 9-13, 2005, 6 pages.

International Search Report issued in PCT/JP2009/050218, mailed on Mar. 3, 2009, with translation, 9 pages.

Written Opinion issued in PCT/JP2009/050218, mailed on Mar. 3, 2009, 3 pages.

3GPP TR 25.814 V7.1.0, Sep. 2006, "Physical layer aspects for evolved Universal Terrestrial Radio Access (UTRA)," 132 pages.

3GPP TSG RAN WG Meeting #47bis, R1-070103, "Downlink L1/L2 Control Signaling Channel Structure: Coding," Jan. 15-19, 2007, 17 pages.

3GPP TS 36.211 V8.1.0, Nov. 2007, "Evolved Universal Terrestrial Radio Access (E-UTRA); Physical Channels and Modulation," 54 pages.

T. Hatori, et al.; "Nobori Link SC-FDMA ni Okeru Ta-Cell Kansho no Eikyo o Koryo shita Proportional Fair-gata Scheduling-ho no Ichi Kento" translated as "A Study on Proportional Fair Scheduling Considering Inter-Cell Interference for Uplink SC-FDMA Access"; Proceedings of the 2008 IEICE General Conference Tsushin 1, Mar. 5, 2008, p. 434, B-5-48 (6 pages).

\* cited by examiner

|  | RB1 | RB2 | RB3 |
|---|---|---|---|
| UE1 | 6 | 10 | 4 |
| UE2 | 4 | 1 | 7 |
| UE3 | 7 | 3 | 9 |

(GROUP 1)

(GROUP 2)

(GROUP 3)

BASE STATION APPARATUS AND METHOD USED IN MOBILE COMMUNICATIONS SYSTEM

BACKGROUND OF THE INVENTION

1. Field of the Invention

The present invention relates generally to the technical field of mobile communications, and specifically to base station apparatuses and methods used in mobile communications system using next-generation mobile communications techniques.

2. Description of the Related Art

In this type of technical field, mobile communications schemes to succeed so-called third generation mobile communications schemes is being studied by 3GPP, a standardization body for Wideband code division multiple access (W-CDMA) schemes. More specifically, Long term evolution (LTE) schemes are being studied at a feverish pace to succeed the W-CDMA, high-speed downlink packet access (HSDPA), and high-speed uplink packet access (HSUPA) schemes. A downlink radio access scheme in the LTE is Orthogonal frequency division multiple access (OFDMA). For uplink, Single-carrier frequency division multiple access (SC-FDMA) is used. (See Non-patent document 1, for example.)

The Orthogonal frequency division multiple access (OFDMA) is a scheme which divides a frequency band into multiple narrow frequency bands (sub-carriers) and overlaying data onto the respective sub-carriers to transmit the overlaid data. Densely lining up the sub-carriers such that they are in an orthogonal relationship with each other on the frequency axis makes it possible to expect that high-speed transmission be achieved and frequency utilization efficiency be increased.

The Single-carrier frequency division multiple access (SC-FDMA) is a single-carrier transmission scheme which divides a frequency bandwidth per terminal and uses mutually different frequency bands among multiple terminals to conduct transmission. Such a scheme as described above, which makes it possible to easily and effectively reduce inter-terminal interference as well as to reduce fluctuations in transmission power, is preferable from points of view of reducing power consumption of terminals and widening the coverage, etc.

In the LTE system, for downlink or uplink, one or more resource blocks (RBs) or resource units (RUs) are allocated to a user apparatus to conduct communication. For convenience of explanations, resource blocks and resource units, which are used interchangeably, both represent units of frequencies for resource allocation. The resource blocks are shared by a large number of user apparatuses within a system. As an example, one resource block has a bandwidth of 180 kHz. For example, 25 resource blocks are included in a system bandwidth of 5 MHz. For example, in the LTE, a base station apparatus determines which user apparatus of multiple user apparatuses a resource block is allocated to for each sub-frame, which is 1 ms. The sub-frame may be called a transmission time interval (TTI). Determining allocations of radio resources is called scheduling. In downlink, abase station apparatus transmits, to a user apparatus selected in the scheduling, a shared channel in one or more resource blocks. The shared channel is called a physical downlink shared channel (PDSCH). In uplink, the user apparatus selected in the scheduling transmits, to the base station apparatus, a shared channel in one or more resource blocks. The shared channel is called a physical uplink shared channel (PUSCH).

In a communications system using the shared channels as described above, it is necessary to signal, for each sub-frame, which user apparatus the shared channel is allocated to. A control channel used in the above-mentioned signaling is called a physical downlink control channel (PDCCH) or a downlink (DL)-L1/L2 control channel. In addition to the PDCCH, a downlink control signal may include a physical control format indicator channel (PCFICH) and a physical hybrid ARQ indicator channel (PHICH).

The PDCCH may include the following information sets, for example. (See Non-patent document 2, for example.):
- downlink scheduling information;
- an uplink scheduling grant;
- a transmission power control command bit.

The downlink scheduling information includes information on downlink shared channel, for example, and, more specifically, includes information on allocating downlink resource block, information on identifying user apparatus (UE-ID), the number of streams, information on pre-coding vector, data size, modulation scheme, information on HARQ (hybrid automatic repeat request), etc.

Moreover, the uplink scheduling grant includes information on uplink shared channel, for example, and, more specifically, includes information on allocating uplink resource, information on identifying user apparatus (UE-ID), data size, modulation scheme, information on uplink transmission power, information on demodulation reference signal in uplink MIMO (multiple-input multiple-output), etc.

The PCFICH is information for reporting the PDCCH format. More specifically, the number of OFDM symbols mapped to the PDCCH is reported using the PCFICH. In the LTE, the number of OFDM symbols mapped to the PDCCH is 1, 2 or 3, which mapping being performed in order from a beginning OFDM symbol of a sub-frame. The PCFICH may be defined as an information set which constitutes a part of the PDCCH or an information set which is different from the PDCCH. The PCFICH is described in Non-patent document 3, for example.

The PHICH includes acknowledgement/non-acknowledgement information (ACK/NACK), which indicates whether retransmission is needed for the PUSCH transmitted in uplink.

For definition of terms, the PDCCH, PCFICH and PHICH may be defined as respectively independent channels, or the PDCCH may be defined to include the PCFICH and PHICH.

In uplink, user data (a normal data signal) and accompanying control information is transmitted using the PUSCH. Moreover, separately from the PUSCH, downlink quality information (CQI; channel quality indicator) and PDSCH acknowledgement/non-acknowledgement information (ACK/NACK), etc. are transmitted using the physical uplink control channel (PUSCH). The CQI is used for downlink physical shared channel scheduling process, adaptive modulation/demodulation and channel encoding process (AMC), etc. In uplink, a random access channel (RACH) and a signal indicating a request for allocating uplink and downlink radio resources are also transmitted as needed.

Now, in resource block scheduling, for each sub-frame, for each user, and, for each resource block, a certain metric $M_{u,f}(i)$ is calculated, and the calculated results are compared with one another. Here, i represents a sub-frame, u represents a user, and F represents a resource block (frequency). Then, a resource block is allocated preferentially to a user indicating a greater metric value. Moreover, transmission formats (data modulation scheme and channel encoding rate (or data modulation scheme and data size)) are determined based on channel conditions. Normally, in scheduling, an amount representing channel conditions (SINR (signal-to-interference plus noise power ratio)) is included in the metrics. Various metrics are used depending on how the scheduling is performed. For example, from a viewpoint of maximizing a system throughput, a maximum CI method is used, where the metric $M_{u,f}(i)$ is given by the equation:

$$M_{u,f}(i) = \gamma_{u,f}(i)$$

The right side represents an instantaneous received SINR in a sub-frame i for a user u. For convenience of explanations, uplink scheduling is assumed. It is always a user with good channel conditions that conducts communications, the throughput becomes maximal. However, this lacks fairness among the users. Then, there is also a scheduling method called a proportional fairness (PF) method. In the PF method, the following metric is used.

$$M_{u,f}(i) = \gamma_{u,f}(i)/E(\gamma_{u,f})$$

Here, E means averaging. The averaging in this case means that the effect of shadowing or of distance fluctuation remains, but the effect of instantaneous fading is smoothed.

The PF method is the same as the maximum CI method in allocating resources to a user with a greater metric $M_{u,f}(i)$, but is different from the maximum CI method in that an average value of received qualities for the user is also taken into consideration. With this method, an opportunity for resource allocation is provided once the channel condition of each user becomes better than an average channel condition for each user apparatus. Thus, an improvement in the throughput may be achieved to some extent while correcting for unfairness due to the maximum CI method.

Non-patent document 1: 3GPP TR 25.814 (V7.1.0), "Physical Layer Aspects for Evolved UTRA," October 2006

Non-patent document 2: R1-070103, Downlink L1/L2 Control Signaling Channel Structure: Coding Non-patent document 3: 3GPP TR36.211 (V8.1.0), "Physical Channels and Modulation", December 2007

SUMMARY OF THE INVENTION

Problem(s) to be Solved by the Invention

As described above, scheduling radio resources in accordance with channel conditions is desirable from viewpoints of improving utilization efficiency of frequency resources, etc. However, when users to which radio resources are allocated change from a certain sub-frame to the following sub-frame, the condition in which interference occurs ends up changing substantially. In particular, a user at a cell edge is affected by greatly-fluctuating other-cell interference. For example, when one user at a cell edge of a certain cell, and another user at a cell edge of a neighboring cell transmit uplink in the same frequency, large interference is caused on each other. Therefore, from a viewpoint of performing link adaptation (AMC) at a subsequent time based on a channel condition at a certain time, it is not desirable for users to change excessively in scheduling. When the followability of the AMC worsens, proper scheduling cannot be expected any more.

One of methods to suppress other-cell interference is to suppress transmission power of another cell user using signaling such as an overload indicator. This method is an easy and direct method. However, it is not optimal in that other-cell interference must be accurately measured within an own cell, and also a resource for signaling to the other cell user must be secured separately.

Another method for suppressing other-cell interference is to group user apparatuses within a cell according to a distance from a base station (e.g., a path loss), and to keep frequencies used per group fixed. Between neighboring cells, frequencies are determined in advance so that cell-edge user groups do not interfere with one another. This method is desirable from a viewpoint of suppressing other-cell interference, but is not desirable in that an optimal resource block cannot be selected according to channel conditions.

Moreover, separately from the user grouping, it is also possible to determine in advance for each cell a frequency which can be used at a cell edge. This is called a fractional frequency reuse (FFR) method. This method is desirable also from a viewpoint of suppressing other-cell interference, but is not desirable in that an optimal resource block cannot be selected in accordance with channel conditions.

The object of the present invention is to encourage allocation of most optimal frequency resource allocations while suppressing fluctuations in other-cell interference in a mobile communications system.

Means for Solving the Problem

In the present invention, a base station apparatus in a mobile communications system is used. The base station apparatus includes a measuring unit which receives a reference signal from a user apparatus and measures received quality for each frequency resource block; a unit which provides a reference metric from the received quality; a modifying unit which modifies the reference metric with at least first and second parameters, and provide the modified metric; a scheduler which compares modified metrics of respective frequency resource blocks and provides a radio resource allocation plan; and a unit which reports, to the user apparatus, control information which indicates the allocation plan. When the radio resource allocation plan is provided for a certain sub-frame, if the user apparatus belongs to a certain group distinguished with a path loss, a value of the first parameter that is used for the user apparatus for a certain frequency resource block varies depending on whether the frequency resource block was allocated to the user apparatus in a preceding sub-frame. If the user apparatus belongs to a certain group distinguished with a path loss, a value of the second parameter used for the user apparatus is arranged to take a first value for a predetermined first frequency resource block and a second value for a predetermined second frequency resource block.

Advantage of the Invention

According to the present invention, most optimal frequency resource allocations are encouraged while suppressing fluctuations in other-cell interference in a mobile communications system.

DESCRIPTION OF THE PREFERRED EMBODIMENTS

Description of Notations

12 Fast Fourier transformation unit (FFT)
14-1 to N Received quality measuring units
16 Resource allocating unit
18 Downlink control channel (PDCCH) generating unit
22 Successive allocation emphasis coefficient unit (A)
24 FFR emphasis coefficient unit (B)
26 Scheduler

Best Mode of Carrying Out the Invention

In one embodiment of the present invention, if a frequency resource block is allocated to a user apparatus in a preceding sub-frame, a first parameter may take a greater value. This is desirable from a viewpoint of encouraging use of the same resource block in successive sub-frames and bringing other-cell interference to the same level as much as possible.

Or conversely, if the frequency resource block is allocated to the user apparatus in the preceding sub-frame, the first parameter may take a smaller value. This is desirable from a viewpoint of encouraging use of different frequency resource blocks in successive sub-frames and randomizing other-cell interference.

Similarly, the first value of the second parameter may be less or greater than the second value.

A modified metric may be provided by multiplying the first and second parameters to a reference metric.

The modified metric may be provided by raising the reference metric to the power of an arithmetic mean value of the first and second parameters. This is desirable from the viewpoint of sharply emphasizing the reference metric.

A method according to one embodiment of the present invention is used in a base station apparatus in a mobile communications system. The present method includes a measuring step of receiving a reference signal from a user apparatus and measuring received quality for each frequency resource block; a step of providing a reference metric from the received quality; a modifying step of modifying the reference metric with at least first and second parameters and providing the modified metric; a scheduling step of comparing modified metrics of respective frequency resource blocks and providing a radio resource allocation plan; and a step of reporting, to the user apparatus, control information which indicates the allocation plan. When the radio resource allocation plan is provided for a certain sub-frame, if the user apparatus belongs to a certain group distinguished with a path loss, a value of the first parameter that is used for the user apparatus for a certain frequency resource block varies depending on whether the frequency resource block was allocated to the user apparatus in a preceding sub-frame. If the user apparatus belongs to a certain group distinguished with a path loss, a value of the second parameter used for the user apparatus is arranged to take a first value for a predetermined first frequency resource block and a second value for a predetermined second frequency resource block.

It may be arranged such that the scheduling step further includes a step of sorting, for each frequency resource block, the modified metrics in descending order; a step of specifying a user apparatus and a frequency resource block that correspond to the maximum modified metric and allocating the frequency resource block to the user apparatus; and a step of excluding the frequency resource block from what is to be allocated to next and such that the allocating and the excluding repeat depending on the number of frequency resource blocks included in a system bandwidth. This is desirable from a viewpoint of easily finding a generally optimum allocation pattern.

While specific numerical value examples are used to facilitate understanding of the present invention, such numerical values are merely examples, so that any appropriate value may be used unless specified otherwise.

Embodiment 1

Base Station Apparatus

Figure 1:
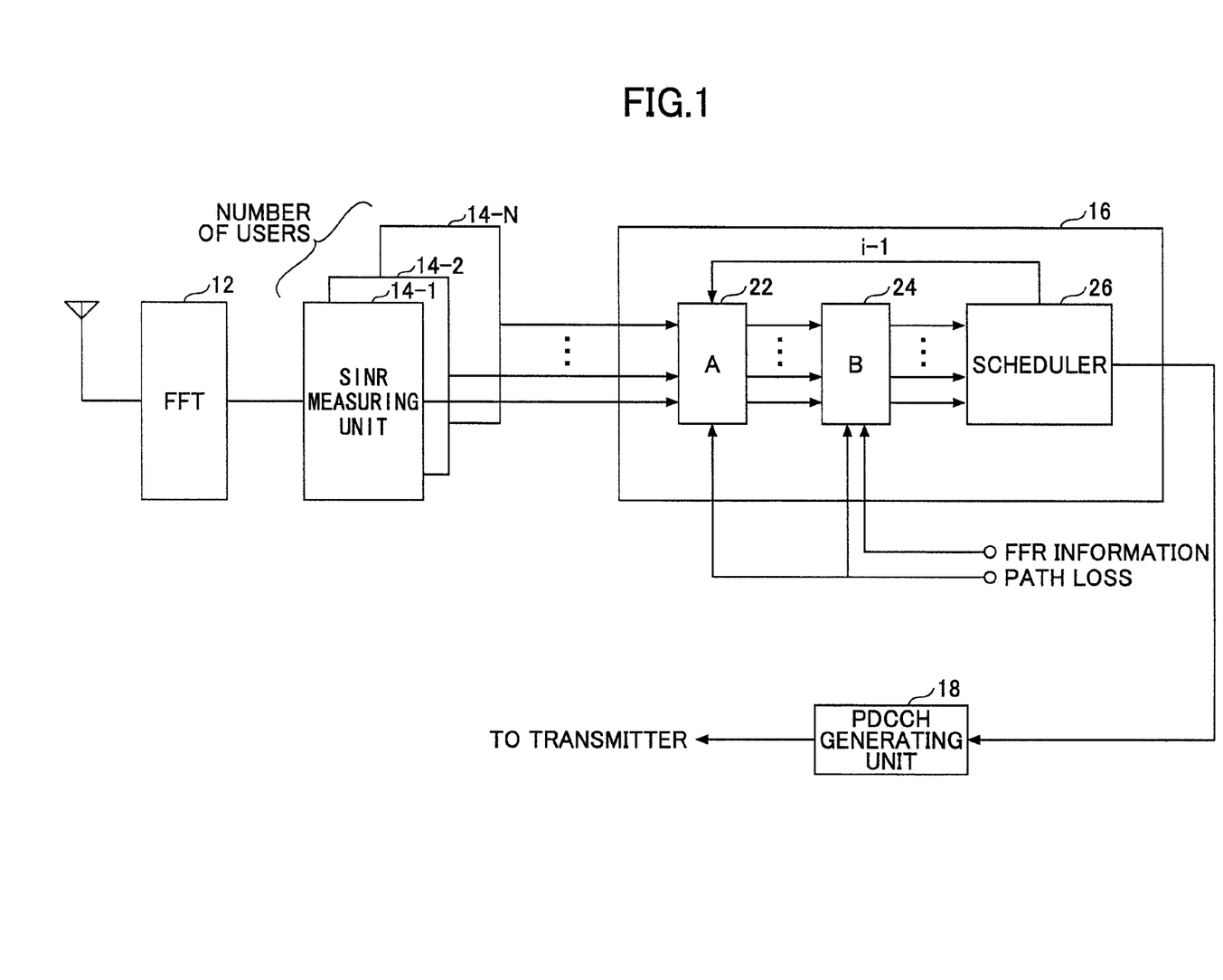
FIG. 1 is a functional block diagram of a base station apparatus according to an embodiment of the present invention.

FIG. 1 shows a base station apparatus according to an embodiment of the present invention. The base station apparatus is used in a mobile communications system which uses a single-carrier frequency division multiple access (SC-FDMA) for uplink. However, the present invention may be used not only for the SC-FDMA system, but also for any system for achieving optimized scheduling such that other-cell interference is suppressed. In the SC-FDMA system, as the effect of other-cell interference becomes particularly strong at a cell edge, the present embodiment is particularly advantageous for such a system.

FIG. 1 shows a fast Fourier transforming unit (FFT) 12, received quality measuring units 14-1 to N, a resource allocating unit 16, a downlink control channel (PDCCH) generating unit 18, a successive allocation emphasis coefficient unit (A) 22, an FFR emphasis coefficient unit (B) 24, and a scheduler 26.

The fast Fourier transforming unit (FFT) 12 fast Fourier transforms a baseband received signal, transforming the received signal to a frequency-domain signal. As the SC-FDMA is used in uplink, a signal received in uplink may be transformed to the frequency-domain signal to properly retrieve a signal mapped to each frequency (resource block or resource unit).

The received quality measuring units 14-1 to N measure uplink received quality for each user apparatus. N represents the number of users. The received quality may be expressed in any appropriate amount representing channel conditions and, for example, may be expressed in SINR, Ec/No, RSRP (reference signal received power), etc. At any rate, the received quality is measured based on a reference signal transmitted in uplink. In the LTE, the user apparatus periodically transmits a sounding reference signal across a system bandwidth. In the example shown, the SINR is used as the received quality. The respective received quality measuring units output measured values of respectively corresponding user apparatuses. The respective measurement values are expressed in received quality measured value $\gamma_{u,f}$. For example, if 25 resource blocks are included in a 5 MHz system bandwidth, 25 received quality measured values $\gamma_1$-$\gamma_{25}$ are obtained from the respective measuring units. The respective received quality measured values $\gamma_{u,f}$ are instantaneous values representing the effects of a path loss (including shadowing and distance attenuation) as well as of instantaneous fading. The received quality measuring units 14-1 to N average the instantaneous value over a predetermined period and/or over a predetermined number of sample values, also calculating an average value E ($\gamma_{u,f}$):

$$P_{u,f}(i) = \gamma_{u,f}/E(\gamma_{u,f})$$

Here, u represents the user, f represents the resource block, i represents time or a sub-frame, $\gamma_{u,f}$ represents received quality measured values, and $E(\gamma_{u,f})$ represents the average value of received quality measured values. In the present embodiment, the proportional fairness (PF) method is used for the scheduling. However, other methods may be used. The reference metric may be provided in various ways depending on the scheduling method. For example, when the maximum CI method is used, the reference metric may be provided such that $P_{u,f}(i) = \gamma_{u,f}$.

The resource allocating unit 16 modifies the reference metrics $P_{u,f}(i)$ from the received quality measuring units 14-1 to N and performs scheduling based on the modified metric $M_{u,f}(i)$. The two types of coefficients are described below. For convenience of explanations below, it is assumed that:

$$M_{u,f}(i) = A_{u,f}(i) \times B_{u,f}(i) \times P_{u,f}(i).$$

However, as described below, the modified metric may be expressed in a different format.

The resource allocating unit 16 outputs control information (for example, uplink scheduling grant) which indicates a radio resource allocating plan. The process of deriving the reference metric $P_{u,f}(i)$ from the received quality measured value $\gamma_{u,f}$ may be performed at the received quality measuring units 14-1 to N, at the resource allocating unit 16, or at a different unit.

The downlink control channel (PDCCH) generating unit 18 receives, from the resource allocating unit 16, control information indicating the radio resource allocating plan, and provides a downlink control channel. The downlink control channel may utilize the PDCCH (physical downlink control channel) in LTE, for example.

The successive allocation emphasis coefficient unit 22 provides one of the above-mentioned coefficients. The successive allocation emphasis coefficient $A_{u,f}(i)$ may be expressed as follows, as an example.

$$A_{u,f}(i) = \frac{a_{u,f}(i)}{\sum_{f=1}^{F} a_{u,f}(i)/F}$$

$$a_{u,f}(i) = \begin{cases} \max(1, PL_u/PL_{refA}) & \text{(A PREDETERMINED CASE)} \\ 1 & \text{(OTHERWISE)} \end{cases}$$

Here, u represents a user, f represents a resource block, and i represents time or a sub-frame. $PL_u$ represents a path loss or propagation loss for the user u, indicating effects of distance attenuation and shadowing, etc. $PL_{refA}$ is a certain value on the path loss, and provided as a system parameter. In general, the path loss becomes greater with a distance from the base station. Thus, $PL_u$ becomes an indicator of how distant the user u is from the base station. $PL_u$ and $PL_{refA}$ may be compared to determine whether the user is distant from the base station by at least a certain distance. For example, whether the user u is located at a cell edge may be determined. In the explanations below, a user with the $PL_u$ greater than the $PL_{refA}$ is determined such that the user is located at the cell edge (a path loss which is sufficiently large to achieve the same is set to the value of the $PL_{refA}$.) The predetermined case means a case such that, at the time of scheduling a certain sub-frame i, a frequency resource block f has been allocated to the user apparatus u at a preceding sub-frame (i−1).

Figure 2:
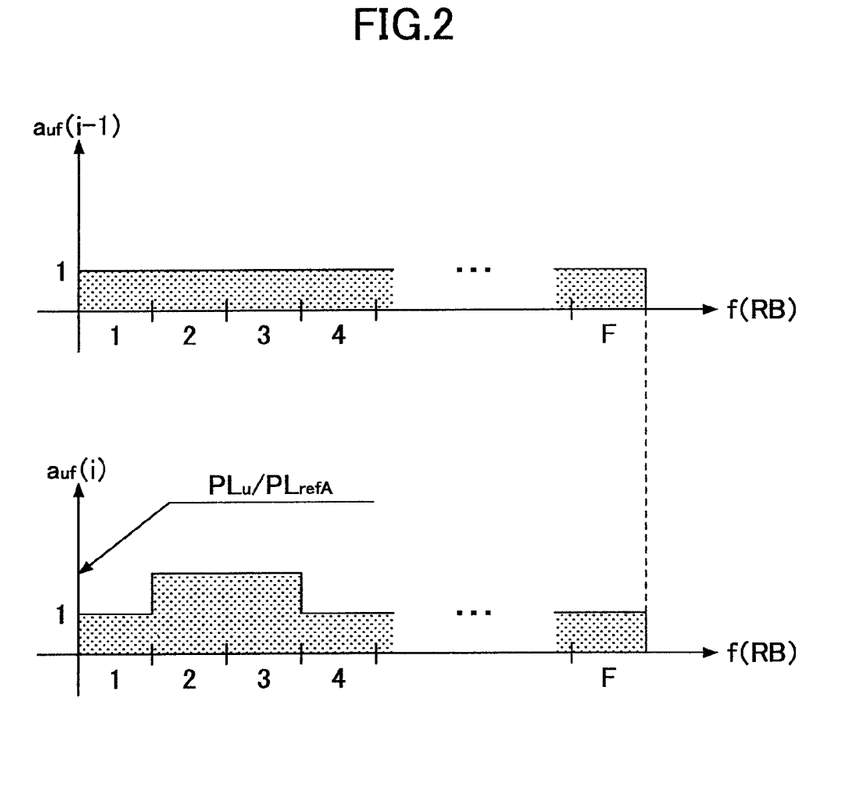
FIG. 2 is a diagram for explaining a successive allocation emphasis coefficient.

FIG. 2 is a diagram for explaining a successive allocation emphasis coefficient $A_{u,f}$. As in the above-described defining equation, the successive allocation emphasis coefficient $A_{u,f}$ is proportional to a coefficient $a_{u,f}$. More accurately, the coefficient $a_{u,f}$ is properly normalized as the successive allocation emphasis coefficient $A_{u,f}$. The characteristic of the successive allocation emphasis coefficient $A_{u,f}$ is substantially equal to the characteristic of the coefficient $a_{u,f}$, so that the $a_{u,f}$ is shown for purposes of brevity and clarity. For convenience of explanations, it is assumed that a system bandwidth includes F resource blocks. It is assumed that, for uplink, scheduling is performed for a sub-frame i after resource blocks 2 and 3 are allocated to a user apparatus u for the first time at a sub-frame (i−1). In this case, at the time of scheduling the sub-frame (i−1), the coefficient $a_{u,f}(i-1)$ used for the user apparatus u takes a value of 1 equally for all resource blocks 1-F as shown in the upper figure:

$$a_{u,f}(i-1) = 1$$

At the time of scheduling the following sub-frame i, the coefficient $a_{u,f}(i)$ used for the user apparatus u takes a value of 1 equally except for the resource blocks 2 and 3, which take a value of $PL_u/PL_{refA}$. In the present example, the user apparatus is located at the cell edge, so that $PL_u/PL_{refA}$ takes a value greater than 1.

$a_{u,f}(i) = PL_u/PL_{refA}$ (for the resource block 2, 3), or 1 (otherwise).

As described above, in the present example, the modified metric $M_{u,f}(i)$ used for the scheduling is proportional to the successive allocation emphasis coefficient $A_{u,f}(i)$ or the coefficient $a_{u,f}(i)$:

$$M_{u,f}(i) = A_{u,f}(i) \times B_{u,f}(i) \times P_{u,f}(i).$$

Therefore, at the time of the scheduling at the sub-frame i, it becomes easier for the user apparatus to be allocated the resource blocks 2 and 3 than the other resource blocks. This is because, while the successive allocation emphasis coefficient emphasizes the modified metric for the resource blocks 2, 3 to be greater, the modified metric for the other resource blocks is not emphasized. When the resource blocks 2 and 3 are allocated to the user apparatus u at the sub-frame (i−1), at the following sub-frame I, it becomes easier for the user apparatus u to be allocated the same resource blocks 2 and 3. What value the modified metric actually takes varies depending on not only the successive allocation emphasis coefficient, but also a value of the reference metric itself and a value of the FFR emphasis coefficient. Therefore, it is not necessarily the case that the resource blocks 2 and 3 are allocated to this user apparatus at a sub-frame i. This largely differs from a related art in which frequencies are allocated on a fixed basis.

The reason that the user seeking to allocate resource blocks 2 and 3 successively at the sub-frames (i−1) and I is limited to a user at a cell edge is to make sure that other-cell interference caused by the user at the cell edge keeps approximately the same level over as long a time period as possible. When condition of allocating resource blocks in packet scheduling changes excessively, interference caused also ends up changing substantially, leading to a possible deterioration in followability of link adaptation and eventually to decrease in system throughput. In the above example, it is made easier for the user u at the cell edge to use the same resource block at both the sub-frame (i−1) and i, so that it is sought to keep interference caused by the user u to approximately the same level for at least two sub-frames.

Therefore, more generally, the successive allocation emphasis coefficient is not limited to the above mathematical expression, so that any appropriate coefficient may be used which changes the reference metric such that the same resource is allocated to the same user at a certain sub-frame and at the following sub-frame. For example, a weight constant $A_{ref}$ of a successive allocation emphasis coefficient may be used to achieve $a_{u,f}(i)=(PL_u/PL_{refA})^{Aref}$. The FFR emphasis coefficient unit (B) 24 also provides one of coefficients which modify the reference metric. The FFR emphasis coefficient $B_{u,f}(i)$ may be expressed as follows, as an example.

$$B_{u,f}(i) = \frac{b_{u,f}}{\sum_{f=1}^{F} b_{u,f}/F}$$

$$b_{u,f} = \begin{cases} \max(1, PL_u/PL_{refB}) & \text{(A PREDETERMINED CASE)} \\ 1 & \text{(OTHERWISE)} \end{cases}$$

Here, u represents a user, f represents a resource block, and i represents time or a sub-frame. $PL_u$ represents a path loss or propagation loss for the user u, indicating effects of distance attenuation and shadowing, etc. $PL_{refB}$ is a certain value on the path loss, and is provided as a system parameter. As in the case of the successive allocation emphasis coefficient $A_{u,f}$, the path loss becomes an indicator of how distant the user is from the base station and also $PL_u$ and $PL_{refB}$ may be compared to determine whether the user is distant from the base station by at least a certain distance. The path loss $PL_{refB}$ to be the reference value may be the same as or different from the above-described $PL_{refA}$. The predetermined case is a case such that the resource block is a predetermined resource block.

As in the above-described defining equation, the FFR emphasis coefficient $B_{u,f}$ is proportional to a coefficient $b_{u,f}$. More accurately, the coefficient $b_{u,f}$ is properly normalized as the FFR emphasis coefficient $B_{u,f}$. The characteristics of the FFR emphasis coefficient $B_{u,f}$ is substantially equal to the characteristics of the coefficient $b_{u,f}$. In the same manner as the coefficient $A_{u,f}$, the coefficient $b_{u,f}$ takes a value different from 1 in a predetermined case and, otherwise, takes a value of 1. However, the predetermined case for the coefficient $b_{u,f}$ is a case such that the resource block is a predetermined resource block and does not depend on sub-frame or scheduling conditions. For example, assuming the predetermined resource block $f_B$, it is encouraged to allocate the resource block $f_B$ to the user at the cell edge, so that it becomes easier for a user not at the cell edge to use a resource block other than $f_B$. Such resource block allocations are performed at each cell. A resource block which is encouraged for use at the cell edge represents different frequencies between neighboring cells (Base stations contact in advance with each other or a system initially make a determination to achieve the same.) Use of a specific frequency may be encouraged for the user at the cell edge to make the effect of other-cell interference as small as possible.

Whether a certain user is located at a cell edge may be determined by comparing the magnitudes of a path loss for the user u and a path loss to be a reference. For a value of the path loss to be the reference, $PL_{refA}$, which is used for the successive allocation emphasis coefficient $A_{u,f}$ and $PL_{refB}$, which is used for the FFR emphasis coefficient $B_{u,f}$ may be the same or different. For example, it may be set such that $PL_{refA} < PL_{refB}$, so that the successive allocation is encouraged for a relatively large number of users, while it is encouraged that use of a specific frequency is strictly limited to a user at a cell edge.

The FFR emphasis coefficient is not limited to the above mathematical expression, so that, in general, any appropriate coefficient may be used which changes the reference metric such that a specific resource is allocated to a specific user distinguished with the path loss. For example, a weight constant $B_{ref}$ of the FFR emphasis coefficient may be used to achieve $$b_{u,f}(i)=(PL_u/PL_{refA})^{Bref}$$

The scheduler 26 uses the modified metric $M_{u,f}(i)=A_{u,f}(i)\times B_{u,f}(i)\times P_{u,f}(i)$ to plan resource allocations. The reference metric is modified as needed using the above coefficient. In the present embodiment, the magnitude of the modified metrics is compared to determine resource allocation plans. A specific method of allocating resources is described below with reference to FIG. 3.

Exemplary Operation

Figure 3:
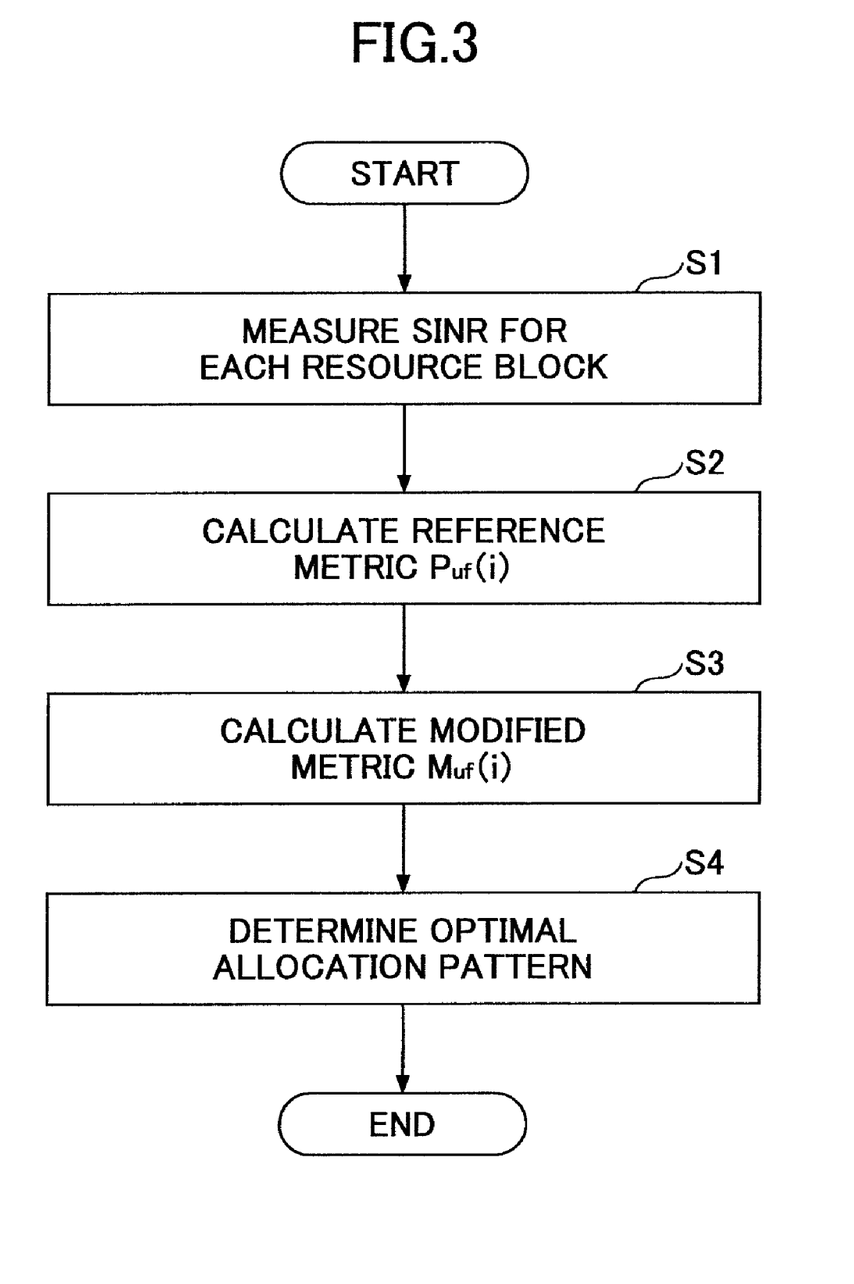
FIG. 3 is a flowchart illustrating a set of exemplary operations according to an embodiment of the present invention.

FIG. 3 is a flowchart for explaining a set of exemplary scheduling operations.

In step S1, a reference signal is received at a base station, and an instantaneous received quality measurement value $\gamma_{u,f}$ (for example, SINR) is measured for each resource block for each user. As needed, an average value $E(\gamma_{u,f})$ of received quality measurement values is also provided.

In step S2, a reference metric $P_{u,f}(i)$ is provided. In the present embodiment, the reference metric is expressed in the following equation from a viewpoint of scheduling with the proportional fairness method:

$$P_{u,f}(i)=\gamma_{u,f}(i)/E(\gamma_{u,f})$$

In step S3, the reference metric is modified based on the above-described predetermined coefficients $A_{u,f}$, $B_{u,f}$, providing the modified metric:

$$M_{u,f}(i)=A_{u,f}(i)\times B_{u,f}(i)\times P_{u,f}(i).$$

In step S4, a radio resource allocation plan is actually determined. From a viewpoint of allocating a resource block to a user yielding a greater modified metric, it is preferable to take into account all possible combinations (allocation patterns) of resource blocks and users for which allocation is desired. Attention needs to be given to the fact that, if SC-FDMA is used in uplink, when multiple resource blocks are allocated to the user apparatus, only a series of resource blocks may be used that is contiguous in the frequency direction. For each of the individual allocation patterns, a total sum of the modified metrics is calculated, so that an allocation pattern yielding the greatest total sum is adopted as an actual allocation pattern.

Figure 4:
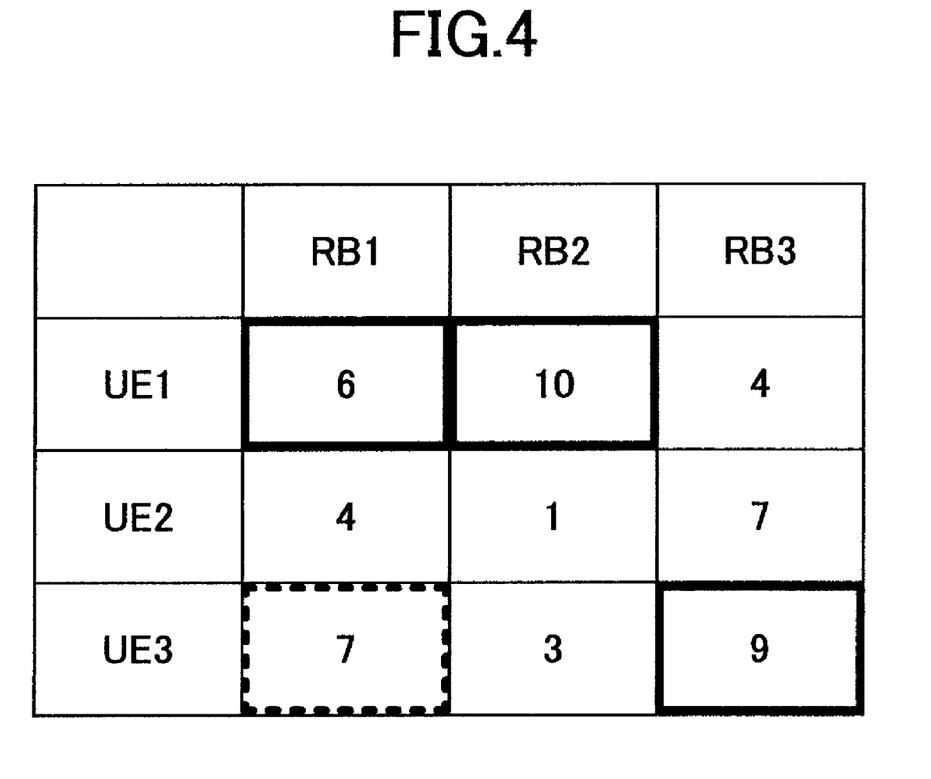
FIG. 4 is a diagram illustrating an example of modified metrics.

For example, allocating is considered of three resource blocks RB1, RB2, RB3 to at least one of three users UE1, UE2, UE3. In this case, suppose the modified metrics take numerical values as shown in FIG. 4.

If all of the resource blocks RB1,RB2,RB3 are allocated to the user UE1, the total sum of the modified metrics for this combination (allocation pattern) becomes 6+10+4=20.

If the resource blocks RB1,RB2 are allocated to the user UE1 and the resource block RB3 is allocated to the user UE2, the total sum of the modified metrics for this combination (allocation pattern) becomes 6+10+7=23.

In the same manner, the total sums of the modified metrics are derived for all of possible allocation patterns. Of these total sums, an allocation pattern yielding the greatest value is determined as an actual allocation pattern. This method may take into account all usable allocation patterns to determine a truly optimal allocation pattern. However, taking into account all of the allocation patterns is not necessarily easy. This is because the number of allocation patterns becomes quite large when allocating a large number of resource blocks to a large number of users. From such a point of view, a simplified method as shown below may be used.

Figure 5:
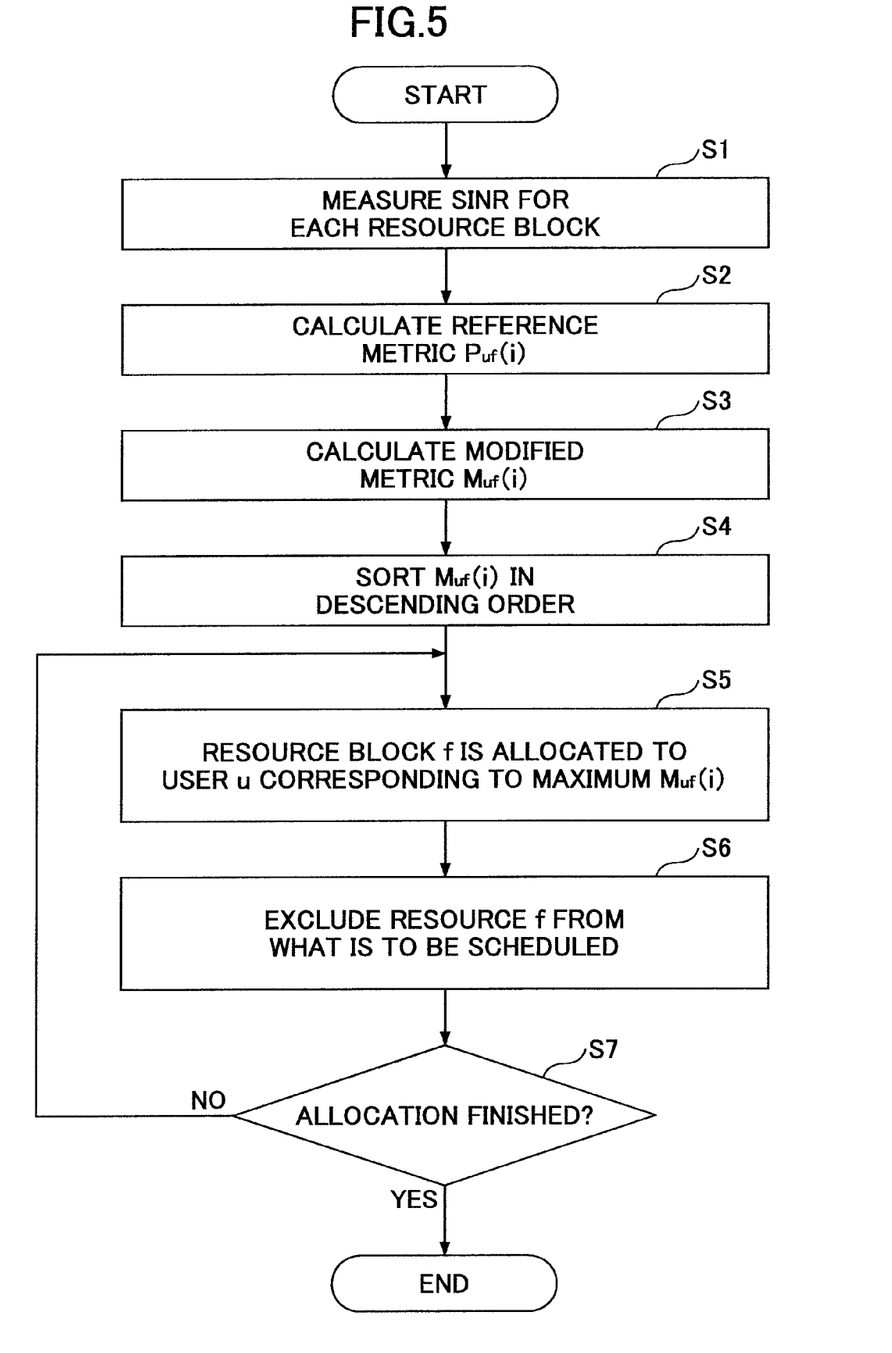
FIG. 5 is a flowchart illustrating another set of exemplary operations according to an embodiment of the present invention.

FIG. 5 is a flowchart for explaining another set of exemplary scheduling operations.

Steps S1-S3 are the same as the steps already described in FIG. 3.

$$P_{u,f}(i)=\gamma_{u,f}(i)/E(\gamma_{u,f})$$

$$M_{u,f}(i)=A_{u,f}(i) \times B_{u,f}(i) \times P_{u,f}(i).$$

In step S4, the modified metrics are sorted in descending order, yielding a modified metric sequence $\{M_{u,f}\}$.

In step S5, a resource block f and a user u that correspond to the maximum modified metric $\max(\{M_{u,f}\})$ are specified. Then, the resource block f is allocated to the user u. Attention needs to be given to the fact that, if SC-FDMA is used in uplink, when multiple resource blocks are allocated to the user apparatus, only a series of resource blocks may be used that is contiguous in the frequency direction.

In step S6, the resource block f is excluded from what is to be scheduled. In this case, the modified metrics of all of the users related to the allocated resource f is excluded from the modified metric sequence.

In step S7, whether all of the resource blocks are allocated to some user is determined. If there is any unallocated resource block remaining, the process flow proceeds to step S5. If there is no unallocated resource block remaining, the process flow ends.

Suppose the modified metrics are obtained as shown in FIG. 4. According to the method of FIG. 5, the nine modified metrics are sorted in descending order. The largest modified metric therein is 10, corresponding to UE1 and RB2. Therefore, RB2 is allocated to UE1. Next, all of the modified metrics related to RB2 is excluded from the modified metric sequence. As shown, modified metrics 10, 1, 3 of UE1, UE2, UE3 related to RB2 are excluded from the modified metric sequence $\{M_{u,f}\}$. As a result, the modified metric sequence ends up including only 6 modified metrics related to RB1 and RB3.

Next, of the 6 modified metrics, the largest modified metric is found. In the present example, this is 9, corresponding to UE3 and RB3. Therefore, RB3 is allocated to UE3. Then, all of the modified metrics related to RB3 are excluded from the modified metric sequence. As shown, the modified metrics 4, 7, and 9 of UE1, UE2, and UE3 related to RB3 are excluded. As a result, the modified metric sequence ends up including only 3 modified metrics related to RB1.

Finally of the 3 modified metrics, the largest modified metric is found. In the present example, this is 7, corresponding to UE3 and RB1. However, RB3 is already allocated to UE3, and RB3 and RB1 are not contiguous, so that it is prohibited to allocate RB1 to UE3. (In SC-FDMA, resource allocation is limited to contiguous resource blocks,) Therefore, the maximum modified metric of 7 is excluded, and the next best modified metric of 6 becomes a candidate for allocation. This corresponds to UE1, which can be allocated to. Thus, RB1 is allocated to UE1. In this way, three resource blocks are easily allocated to at least one user.

Variations

1. Modified Metric

In the above example, the modified metric is expressed as a mathematical expression such that two coefficients are multiplied to the reference metric:

$$M_{u,f}(i)=A_{u,f}(i) \times B_{u,f}(i) \times P_{u,f}(i).$$

However, the present invention is not limited to such mathematical expressions, so that any appropriate mathematical expressions may be used. This is because it suffices to be able to modify the reference metric for a specific frequency of a specific user. For example, the modified metric may include the above coefficient as the power:

$$M_{u,f}(i)=P_{u,f}(i)^\alpha$$

$$\alpha=(A_{u,f}(i)+B_{u,f}(i))/2$$

As described above, in the predetermined case, both $A_{u,f}$ and $B_{u,f}$ become greater than 1, and otherwise they are 1. In the predetermined case, α becomes greater than 1, and otherwise it is 1. Therefore, in the predetermined case, the reference metric is emphasized by the power α, which is greater than 1, and otherwise it remains to be the power of 1, On the other hand, with the general proportional fairness method, the reference metric $P_{u,f}$ is calculated as $P_{u,f}(i)=\gamma_{u,f}(i)/E(\gamma_{u,f})$. When an instantaneous value of the received quality measurement value is greater than the average value, the reference metric becomes greater than 1, and otherwise becomes less than 1. Thus, for a user at a cell edge, if a resource was allocated at a preceding sub-frame or if a resource is a predetermined resource, a reference metric which is greater than 1 is emphasized such that it sharply increases from the power of one. A reference metric which is less than 1 is emphasized such that it sharply decreases from the power of one. As a result, it is more strongly reflected in the modified metric that a predetermined resource is to be allocated to the user in question in the predetermined case.

From the viewpoint of further sharply emphasizing the reference metric, it may be calculated such that $\alpha=A_{u,f}(i) \times B_{u,f}(i)$.

2. Coefficient Value

Figure 6:
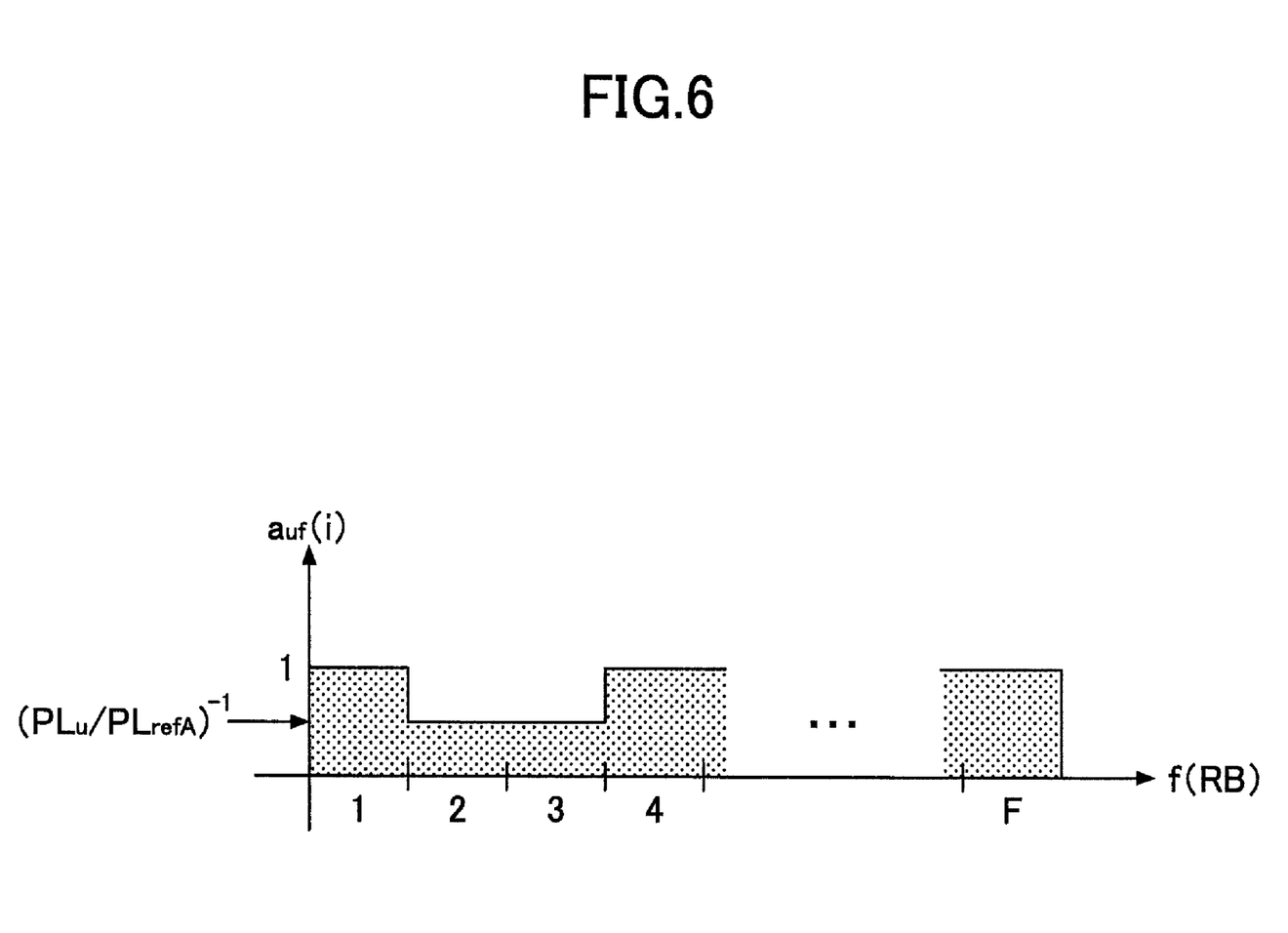
FIG. 6 is a diagram illustrating another setting example of a coefficient value.

Values to be taken by the above coefficients $A_{u,f}(i), B_{u,f}(i)$ are determined from a viewpoint of increasing the reference metric in the predetermined case. A larger modified metric encourages that the user uses the resource block. Conversely, however, it is also possible to modify the reference metric such that the user is made not to use a certain resource block. This is because it suffices for other-cell interference to relatively decrease over a long term. From such a viewpoint, a value as shown in FIG. 6 may be used for a coefficient of a user not at a cell edge instead of using, as a value of a coefficient of a user at a cell edge, a value as shown on the lower side of FIG. 2. In a case of FIG. 2, a value of a coefficient for resource blocks 2 and 3 is made greater, but in a case of FIG. 6, the value of the coefficient is smaller for resource blocks 2 and 3. Even then, it is possible to encourage the cell-edge user to use the resource blocks 2 and 3 as a result.

Alternatively, if the resource blocks 2 and 3 are allocated to the user u at a preceding sub-frame (i−1), it is also advantageous to make it more difficult for the user u to allocate the resource blocks 2 and 3 at the following sub-frame i. For the user in question, at the following sub-frame i, it is encouraged for the user to user resource blocks other than the resource blocks 2 and 3. From a short-term viewpoint related to these two sub-frames, it may appear not desirable in that other-cell interference ends up varying substantially. However, the user u may be made to transmit in different resource blocks as much as possible at successive sub-frames to encourage frequency hopping, making it possible to expect randomizing other-cell interference over a long term. Therefore, from a viewpoint of encouraging successive allocations as described above, it is preferable to increase the value of the coefficient for the resource block used, but from a point of view of encouraging that other-cell interference be randomized, it is preferable to decrease the value of the coefficient for the resource block used. At any rate, for the cell-edge user, it suffices for the values of coefficients used for a certain resource block to vary depending on whether the resource block was allocated to the user at the preceding sub-frame.

3. Grouping

A value of a path loss may be used not only for determining whether the user is located at a cell edge, but also for grouping users according to a distance from the base station. In this case, use of a first frequency may be encouraged to a user belonging to a first group, use of a second frequency may be encouraged to a user belonging to a second group, and it may be encouraged for each group to use a different frequency.

Figure 7:
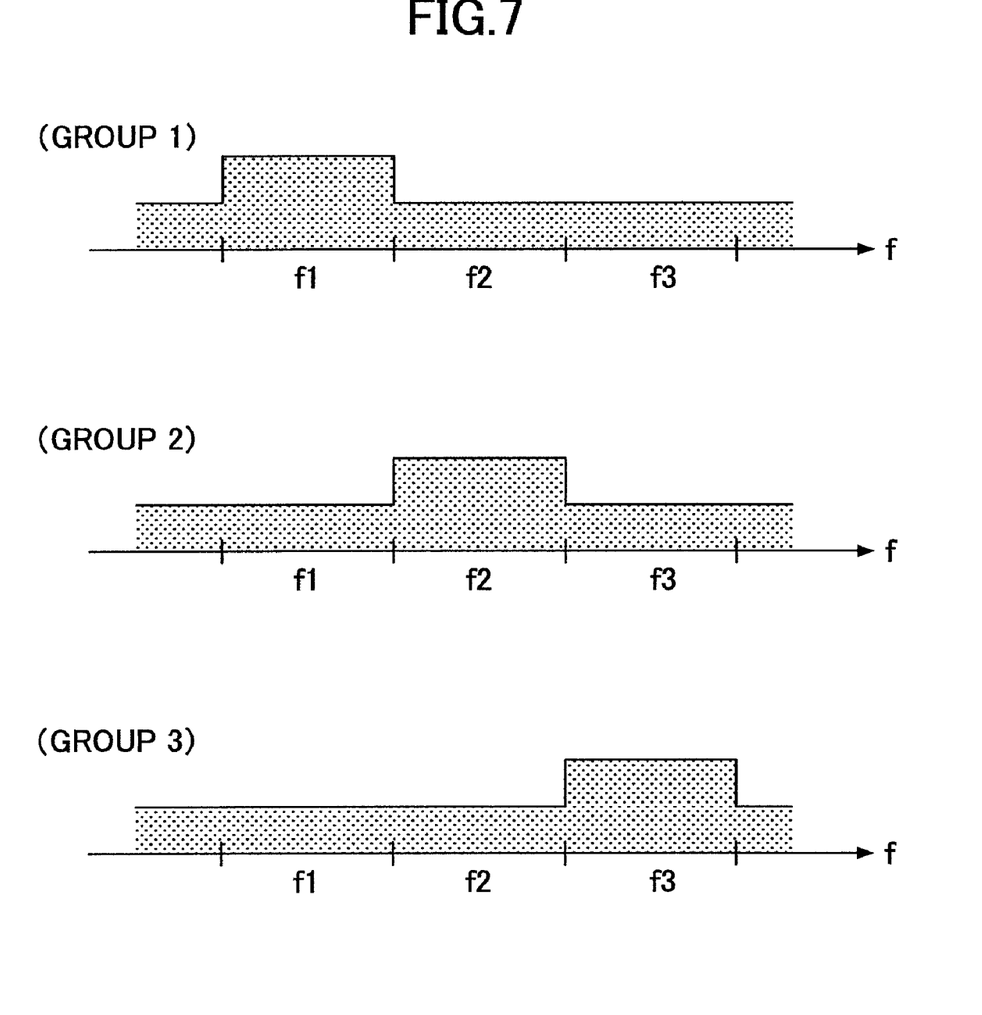
FIG. 7 is a diagram illustrating an example of setting a coefficient which encourages use of frequencies which vary from one path-loss group to another.

FIG. 7 shows how a value of a coefficient is set such as to encourage use of different frequencies for each path loss group. The first frequency $f_1$ and the second frequency $f_2$, etc. correspond to one or more resource blocks. For a cell-edge user group, a coefficient is set such that use of a frequency which is different from that for a neighboring cell cell-edge user group is encouraged.

In the conventional grouping, a frequency usable is fixed for each group. However, in an example shown in FIG. 7, the frequency is not fixed, use of a specific frequency being encouraged merely by a coefficient which modifies the reference metric. The present method substantially differs from a conventional method in which a frequency is fixed in that the whole system bandwidth is usable depending on values taken by modified metrics.

4. Other Coefficient

It has been described in the above that the reference metric is modified by two coefficients, introducing modified metrics. However, the present invention is not limited to two coefficients, so that the reference metric may be further modified from another appropriate viewpoint. For example, the modified metric may be derived as:

$$M_{u,f}(i)=A_{u,f}(i) \times B_{u,f}(i) \times C_{u,f}(i) \times P_{u,f}(i).$$

$C_{u,f}(i)$ is an emphasis coefficient using any other viewpoint. For example, if the average value $E(\gamma f)$ of the received quality measured values exceeds a predetermined value, $C_{u,f}(i)$ may be arranged to take a value larger than 1 to make it easy for the user to be allocated a resource.

While the present invention is described with reference to specific embodiments, the embodiments are merely exemplary, so that a skilled person would understand variations, modifications, alternatives, and replacements. While specific numerical value examples are used to facilitate understanding of the present invention, such numerical values are merely examples, so that any appropriate value may be used unless specified otherwise. While specific mathematical expressions are used to facilitate understanding of the present invention, such mathematical expressions are merely examples, so that any appropriate mathematical expressions may be used unless specified otherwise. A breakdown of embodiments or items is not essential to the present invention, so that matters described in two or more embodiments or items may be used in combination as needed, or matters described in a certain embodiment or item may be applied to matters described in a different embodiment or item as long as they do not contradict. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present application claims priority based on Japanese Patent Application No. 2008-15493 filed on Jan. 25, 2008 with the Japanese Patent Office, the entire contents of which are hereby incorporated herein by reference.

The invention claimed is:

1. A base station apparatus in a mobile communications system, comprising:
    a measuring unit which receives a reference signal from a user apparatus and measures received quality for each frequency resource block;
    a unit which provides a reference metric from the received quality;
    a modifying unit which modifies the reference metric with at least first and second parameters, and provide the modified metric;
    a scheduler which compares modified metrics of respective frequency resource blocks and provides a radio resource allocation plan; and
    a unit which reports, to the user apparatus, control information which indicates the allocation plan, wherein, when the radio resource allocation plan is provided for a certain sub-frame, if the user apparatus belongs to a certain group distinguished with a path loss, a value of the first parameter that is used for the user apparatus for a certain frequency resource block varies depending on whether the frequency resource block was allocated to the user apparatus in a preceding sub-frame,
    and, if the user apparatus belongs to a certain group distinguished with a path loss, a value of the second parameter used for the user apparatus is arranged to take a first value for a predetermined first frequency resource block and a second value for a predetermined second frequency resource block.

2. The base station apparatus as claimed in claim 1, wherein, if the frequency resource block was allocated to the user apparatus in the preceding sub-frame, the first parameter takes a larger value.

3. The base station apparatus as claimed in claim 1, wherein, if the frequency resource block was allocated to the user apparatus in the preceding sub-frame, the first parameter takes a smaller value.

4. The base station apparatus as claimed in claim 1, wherein the first value of the second parameter is smaller than the second value.

5. The base station apparatus as claimed in claim 1, wherein the first value of the second parameter is larger than the second value.

6. The base station apparatus as claimed in claim 1, wherein the modified metric is provided by multiplying the first and second parameters to the reference metric.

7. The base station apparatus as claimed in claim 1, wherein the modified metric is provided by raising the reference metric to a power of an arithmetic mean value of the first and second parameters.

8. The base station apparatus as claimed in claim 1, wherein the first parameter $A_{u,f}(i)$ is calculated as $$A_{u,f}(i) = \frac{a_{u,f}(i)}{\sum_{f=1}^{F} a_{u,f}(i)/F}$$

$$a_{u,f}(i) = \begin{cases} \max(1, PL_u/PL_{refA}) & \text{(A PREDETERMINED CASE)} \\ 1 & \text{(OTHERWISE)}, \end{cases}$$

u represents a user, f represents a resource block, i represents time, F represents the number of resource blocks included in a system bandwidth, $PL_u$ represents the path loss of the user apparatus, $PL_{refA}$ represents a predetermined reference value related to the path loss, wherein the predetermined case is a case such that the frequency resource block was allocated to the user apparatus in the preceding sub-frame.

9. The base station apparatus as claimed in claim 1, wherein the second parameter $B_{u,f}(i)$ is calculated as $$B_{u,f}(i) = \frac{b_{u,f}}{\sum_{f=1}^{F} b_{u,f}/F}$$

$$b_{u,f} = \begin{cases} \max(1, PL_u/PL_{refB}) & \text{(A PREDETERMINED CASE)} \\ 1 & \text{(OTHERWISE)}, \end{cases}$$

u represents a user, f represents a resource block, i represents time, F represents the number of resource blocks included in a system bandwidth, $PL_u$ represents the path loss of the user apparatus, $PL_{refB}$ represents a predetermined reference value related to the path loss, wherein the predetermined case is a case such that the frequency resource block was the predetermined first frequency resource block.

10. The base station apparatus as claimed in claim 1, wherein the scheduler provides the radio resource allocation plan in accordance with a proportional fairness method.

11. The base station apparatus as claimed in claim 1, wherein the mobile communications system uses a single-carrier frequency division multiple access (SC-FDMA) for uplink.

12. A method used in a base station apparatus in a mobile communications system, comprising:
   a measuring step of receiving a reference signal from a user apparatus and measuring received quality for each frequency resource block;
   a step of providing a reference metric from the received quality;
   a modifying step of modifying the reference metric with at least first and second parameters and providing the modified metric;
   a scheduling step of comparing modified metrics of respective frequency resource blocks and providing a radio resource allocation plan; and
   a step of reporting, to the user apparatus, control information which indicates the allocation plan, wherein, when the radio resource allocation plan is provided for a certain sub-frame, if the user apparatus belongs to a certain group distinguished with a path loss, a value of the first parameter that is used for the user apparatus for a certain frequency resource block varies depending on whether the frequency resource block was allocated to the user apparatus in a preceding sub-frame,
   and, if the user apparatus belongs to a certain group distinguished with a path loss, a value of the second parameter used for the user apparatus is arranged to take a first value for a predetermined first frequency resource block and a second value for a predetermined second frequency resource block.

13. The method as claimed in claim 12, wherein the scheduling step further includes:
   a step of sorting, for each frequency resource block, the modified metrics in descending order;
   a step of specifying a user apparatus and a frequency resource block that correspond to the maximum modified metric and allocating the frequency resource block to the user apparatus; and
   a step of excluding the frequency resource block from what is to be allocated to next, wherein the allocating and the excluding are arranged to repeat depending on the number of frequency resource blocks included in a system bandwidth.

* * * * *